Aug. 7, 1934.  J. W. YOUNG ET AL  1,969,288
TRAILER HITCH
Filed Jan. 22, 1934   2 Sheets-Sheet 1

Inventors
John W. Young
Raymond Salyer
Billie Bryan
By Clarence A. O'Brien
Attorney Aug. 7, 1934.  J. W. YOUNG ET AL  1,969,288
TRAILER HITCH
Filed Jan. 22, 1934  2 Sheets-Sheet 2

Inventors
John W. Young
Raymond Salyer
Billie Bryan
By Clarence A. O'Brien
Attorney Patented Aug. 7, 1934

1,969,288

UNITED STATES PATENT OFFICE 1,969,288

TRAILER HITCH

John W. Young, Raymond Salyer, and Billie Bryan, Binger, Okla.

Application January 22, 1934, Serial No. 707,812

1 Claim. (Cl. 280—33.1)

The present invention appertains to new and useful improvements in vehicle hitches, such as are employed in connecting trailers to trucks, the principal object of the present invention being to provide a hitch which can be quickly detached without the actual removal of any parts of the hitch.

Another important object of the present invention is to provide a hitch which can be quickly operated without any inconvenience and which when once connected, will remain secure against any likelihood of self-disconnection.

A further object is to provide a hitch in the construction of which the usual king pin is entirely eliminated along with its potential defects, which are mostly occasioned by the fact that practically all of the stress and strain of the coupled vehicles is directly on this element.

Other important objects and advantages of the invention will become apparent to the reader of the following specification.

In the drawings:—

Figure 1:
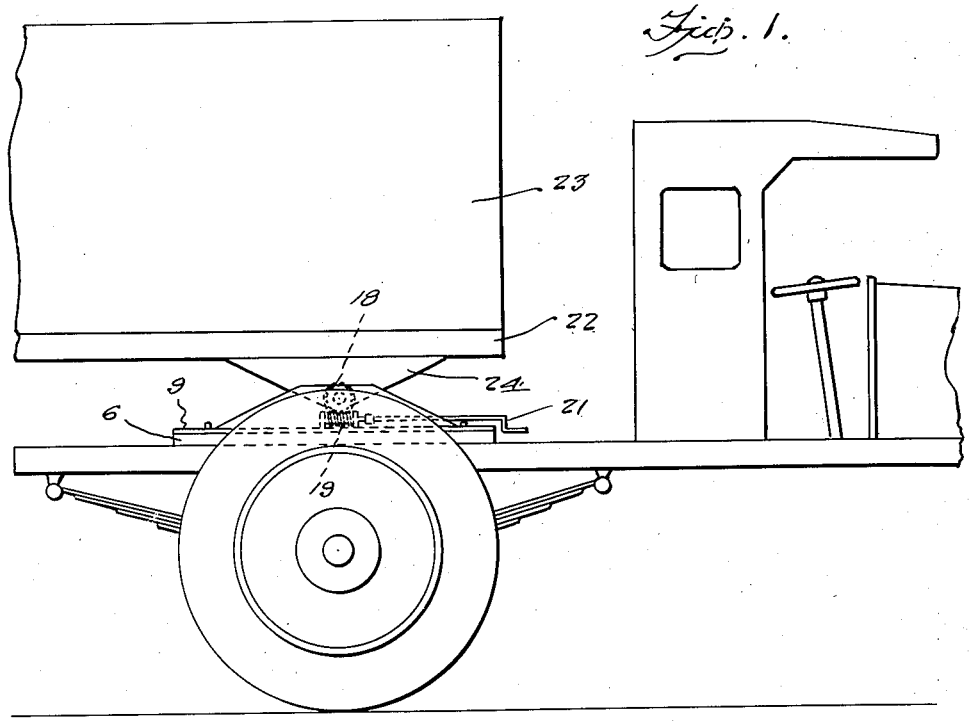
Figure 1 represents a fragmentary side elevational view showing the hitch connecting a trailer to a truck.
Figure 3:
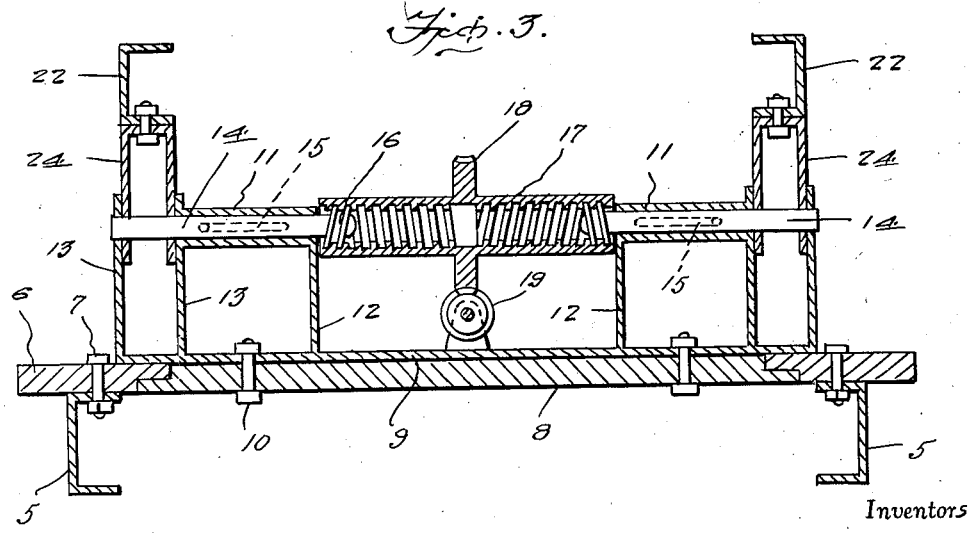
Figure 3 represents a transverse sectional view through the hitch.
Figure 2:
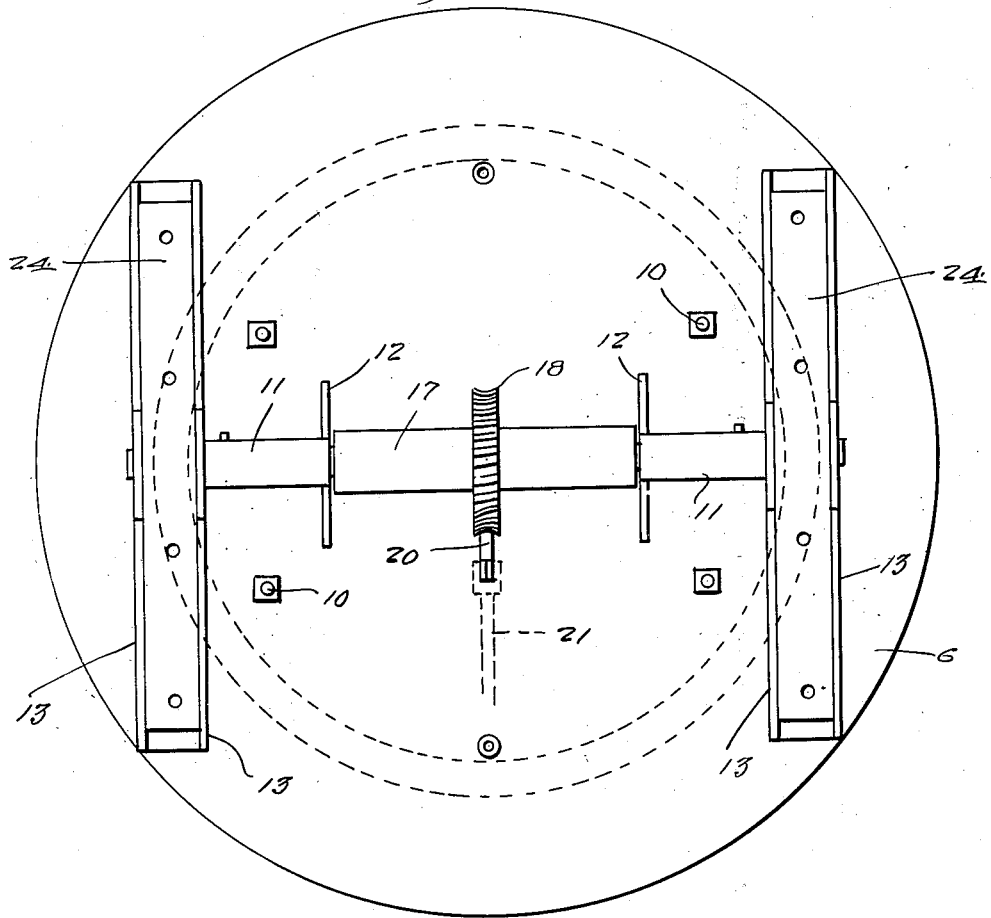
Figure 2 represents a top plan view of the truck supporting mechanism.
Figure 4:
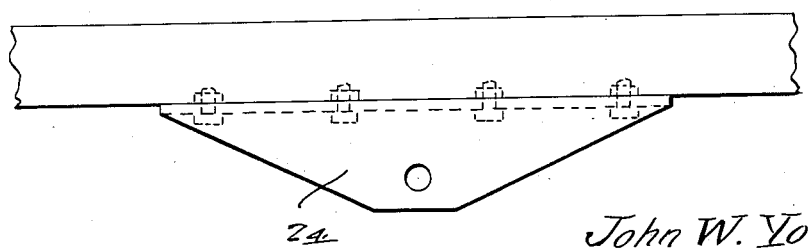
Figure 4 represents a fragmentary side elevational view showing the attachment required for the trailer.

Referring to the drawings wherein like numerals designate like parts, it can be seen that numerals 5—5 represent the chassis bar of the truck upon which the ring 6 is secured by bolts 7. The ring 6 is provided with a rabbeted portion for receiving the peripheral portion of the disk 8, while resting upon the ring 6 is a complementary disk 9 secured to the disk 8 by bolts 10. Tubular bearings 11—11 are horizontally supported by uprights 12 in conjunction with the uprights 13—13, a pair of the latter being located at diametrically opposite points on the disk 9. The hitch pins 14, one for each of the bearings 11, are connected to the bearings by pin and slot connections 15, so that they cannot rotate in the bearings and as is clearly shown in Figure 3, these pins 14, at their inner ends, are provided with worms 16 meshing with the internally threaded sleeve 17 provided at an intermediate point with the gear 18. This gear 18 meshes with the worm 19 supported upon the disk 9 and this worm has a polygonal-shaped shaft extension 20 with which a suitable hand crank 21 can be engaged to permit rotation thereof and consequent rotation of the sleeve 17.

The supports 13—13 on each diametrically opposite point of the disk 9 are provided with registering openings through which the corresponding hitch pins 14 can project.

Numerals 22—22 represent the frame bars of the trailer 23 and secured to the bottom of these are the channeled structures 24, the depending flanges of which are engageable between the upstanding supporting members 13—13. The flanges of the channeled members 24 have registering openings therein through which the hitch pins 14 can engage.

Obviously, it can be seen that the trailer can be positioned so that the openings in their channeled members 24 will be registering with the openings in the corresponding uprights 13 and by rotating the worm 19 and the sleeve 17, the pins 14 will be slid outwardly and simultaneously to positively connect the trailer to the truck. Obviously, the pins can be operated in the reverse direction for as quickly disconnecting the trailer from the truck.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

In combination, a truck, a trailer, a fifth wheel on the truck, a pair of depending apertured members on the trailer, a pair of slide pins on the truck, and means for operating the said pins simultaneously to engage or disengage the pins with respect to the depending apertured members on the trailer, said means consisting of an internally oppositely threaded sleeve, means for rotating the sleeve, and worms on the pins meshing with the threads of the internally threaded sleeve.

JOHN W. YOUNG.
RAYMOND SALYER.
BILLIE BRYAN.